D. C. HENRY.
ELECTRICAL MAGNETIC DRIVE AND CLUTCH.
APPLICATION FILED MAR. 22, 1916.
1,259,861.
Patented Mar. 19, 1918.
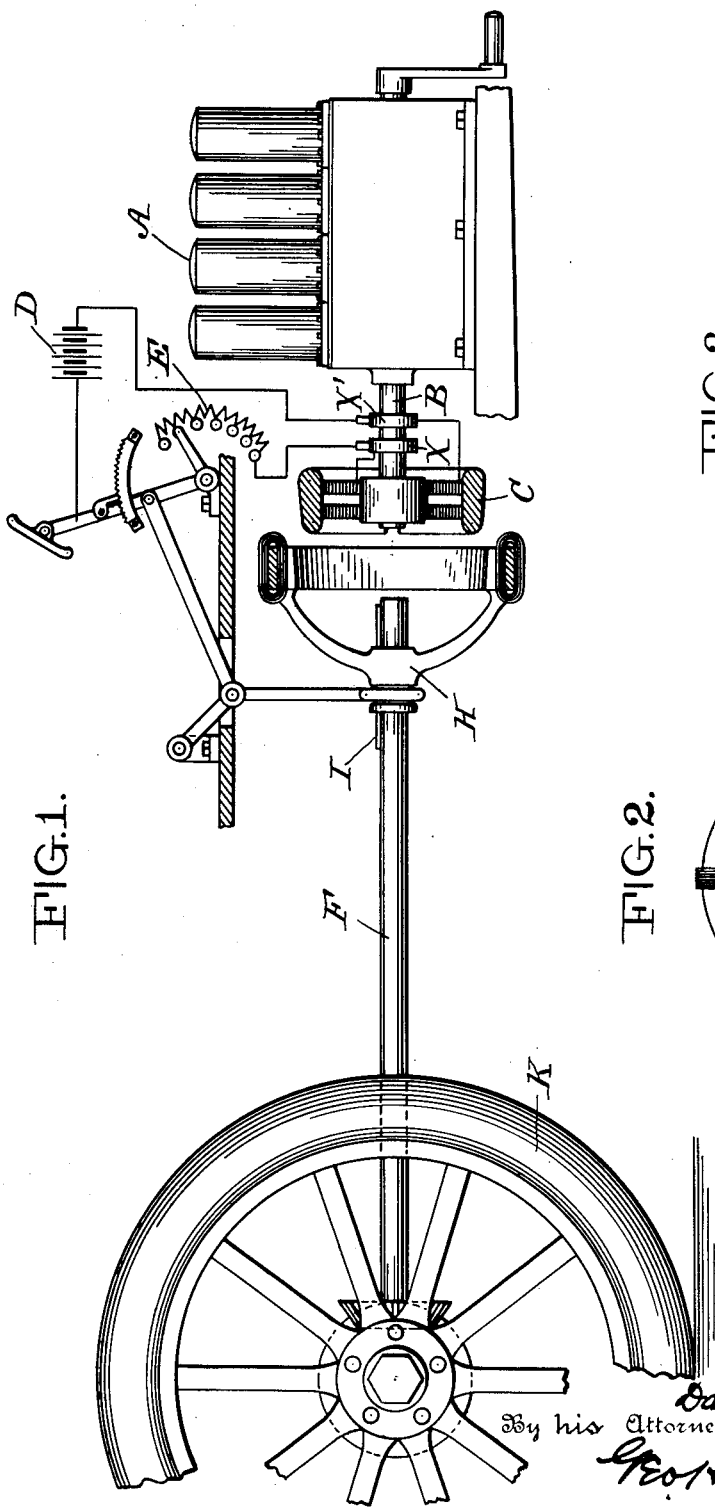
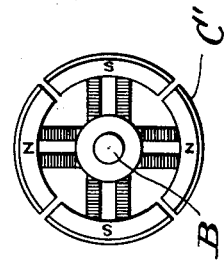
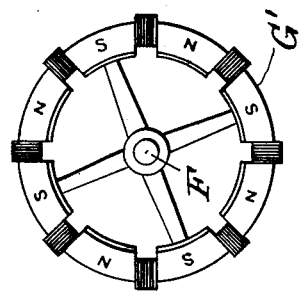

UNITED STATES PATENT OFFICE.

DAVID CARL HENRY, OF ROSEBANK, NEW YORK, ASSIGNOR TO MAGNETIC TRANSMISSION COMPANY, OF NEW YORK, N. Y., A CORPORATION OF NEW YORK.

ELECTRICAL MAGNETIC DRIVE AND CLUTCH.

1,259,861.  Specification of Letters Patent.  Patented Mar. 19, 1918.

Application filed March 22, 1916. Serial No. 85,789.

*To all whom it may concern:*

Be it known that I, DAVID CARL HENRY, a citizen of the United States, residing at Rosebank, county of Richmond, Staten Island, State of New York, have invented certain new and useful Improvements in an Electrical Magnetic Drive and Clutch, of which the following is a specification.

My invention relates to a type of magnetic drive particularly adapted for use in automobiles, etc., but I do not necessarily limit myself to this connection, for said herein described drive is equally applicable to street railway motors and their driving mechanism, for aeroplanes, submarine boats, or in any connection where a variable speed is desired between the prime mover, such as an internal combustion motor, and the driving mechanism, or where it is desired to interpose a clutch between said members, the prime mover and the driven mechanism.

In the present day automobile clutch, with friction contact, it is evident that there is an absence of flexibility between the prime mover and the driven mechanism when said clutch is in position or set and this absence of flexibility is not only serious to the entire mechanism but transmits vibrations, shocks, etc., from the rear axle to, and along, the crank shaft, resulting in many cases in breakdowns or engine stoppages which are dangerous to life and security.

Said herein described clutch, with its attendant mechanism, carries within itself a change-speed mechanism allowing, in a flexible manner, any degree of rotation up to the engine's ultimate capacity, and said speed-changing mechanism, unlike the limited changes of speed found in the present-day automobiles, is practically infinite, as in the case of a throttle-controlled steam engine or a resistance-controlled electric motor. All of said advantages being obtained by a graduated resistance placed in one member of the drive and a graduated position change in the second member of the drive.

In the drawings Figure 1 represents a side sectional view of an automobile.

In the drawings Fig. 2 represents an end section of a spider clutch which acts as the armature of said clutch.

In the drawings Fig. 3 represents an end view of the field mechanism of said clutch designed to be contained within said spider section by movement along the slotted or keyed shaft of said spider section but not in any manner to make actual contact with said spider section.

The action of the entire mechanism is as follows: In the drawing Fig. 1 A represents a prime mover such as a gasolene engine with a shaft B driven at a fairly constant speed. C Fig. 1 or C' Fig. 3 represent a four pole rotary field keyed in a solid and substantial manner to shaft B. Said field being revolved by prime mover A and being magnetized by an outer source of current such as shown at battery D. $x$ and $x'$ being collector rings upon said shaft B. Within the circuit of said field or fields I have placed a rheostat E so as to increase or decrease the strength or number of magnetic lines of force given out by field C. However, in this connection I do not necessarily limit myself to any particular method of obtaining my energized field C. It is evident that a current could be obtained by a small generator or magneto. It is also evident that the pole pieces of field C could be composed of permanent magnets of the desired strength to obtain the necessary lines of magnetic force.

Having obtained a rotary field as shown, or substantially as shown, and a method of increasing and decreasing said field strength, substantially as shown, I next, by simple manually operated mechanism, cause spider G which is held in sliding position on shaft F, Fig. 1, by collar H, to move along shaft F (said spider being keyed to shaft F by key I) and to envelop or inclose to whatever degree necessary the rotary fields C, Fig. 1 and, as seen by the drawing Fig. 1, said pole pieces on field C are tapered so as to fit within but not to come in contact with the taper spider G. Spider G, Fig. 1, represents the armature of which C, Fig. 1, is the fields. Said armature being slotted as shown in G', Fig. 2, and said slots being wound with a close circuit of heavy and low resistance wire or bars.

It is evident then, as fields C revolve (being energized from an outer source) that the interposition of spider G caused by its movement along the keyed shaft F will cause to be generated within the closed coils of armature G', Fig. 2, a current great or less according to their proximity to the pole pieces of C', Fig. 3, and this said current will set up lines of magnetic force of greater or less degree tending to cause, or causing, armature G', Fig. 2, or spider G, Fig. 1, to revolve at a rate and at a torque sufficient to transmit without actual contact all, or approximately all, the power generated by engine A to the shaft F and by suitable means to driving the wheel K.

It will at once be seen that by this new and novel tapering of the face of the armature G', Fig. 2, and the tapering field that a close or distant air gap can be secured between the two members of the mechanism, said air gap offering a resistance to the magnetic lines of force flowing between and causing a variable speed to be obtained on the driving wheel K or shaft F. It will also be seen that the movement in or out of spider G acts as a clutch without contact, a clutch whose loss of torque and transmitting power is determined by efficiency in design and construction.

I do not necessarily limit myself to the construction as shown wherein the position of the armature and rheostat place in the field resistance are actuated by one mechanism. They may be separately actuated or controlled to admit of greater variation. Also it may readily be seen that by an interposition of armature and field the same result would be obtained.

What I do wish to bring out is that by two methods, either practical,—the first, the varying of resistance within the field coils; the second, by opening or closing an air gap between an armature and field,—I obtain a clutch of greater or lesser intensity as well as a change-speed mechanism, doing away altogether with the cumbersome and noisy transmission as used in present-day automobile practice, as well as providing a flexible clutch and control.

The new and novel tapered faces upon both rotor and stator allow for the least lateral motion to vary the degree of air gap, acting, as it were, as a magnet clutch without actual contact or friction.

This case is for the same invention as that described in my former application, Serial No. 588,766, filed October 24, 1910.

Having thus described my invention, I claim:

1. In an electrical magnetic drive and clutch, the combination of a rotary driving member, means for magnetizing said member, a rotary driven member, said members having tapered coacting faces, and means for moving the driven member in an axial direction to and from the driving member.

2. In an electrical magnetic drive and clutch, the combination of a rotary driving member having a tapered outer periphery, means for magnetizing said member, a rotary driven member having a tapered inner periphery, and means for moving the driven member in an axial direction to and from the driving member.

3. In an electrical magnetic drive and clutch, the combination of a rotary driving member having a tapered outer periphery, means for magnetizing said member, a rotary driven member having a tapered inner periphery, and in size sufficient to inclose the rotary driving member, and means for moving the driven member in an axial direction to and from the driving member.

4. In an electrical magnetic drive and clutch, the combination of a rotary driving member consisting of a series of magnets having pole pieces disclosed in a circle and said pole pieces tapered, means for magnetizing said member, a rotary driven member consisting of an annular core having closed coils disposed thereon and having its inner periphery tapered to coincide with the taper of the outer periphery of the driving member, and means for moving the driven member in an axial direction to and from the driving member.

5. In an electrical magnetic drive and clutch, the combination of a rotary driving member, means for varying the magnetism of said member, a rotary driven member designed to rotate by magnetic induction derived from the rotary driving member, said members having tapered coacting faces, and means for varying the air gap and magnetic impediment between the driving and driven members.

6. In an electrical magnetic drive and clutch, the combination of a rotary magnetic driving member, a shaft for supporting said member, a rotary driven member, having coils thereon adapted to have currents induced therein from the rotary magnetic member, a shaft for supporting said rotary driven member arranged in the same axial line as the shaft of the driving member, said driving and driven members having coacting tapered faces, means for varying the magnetism of the rotary driving member, and means for giving to the rotary driven member a motion along its supporting shaft, to and from the rotary driving member.

7. In an electrical magnetic drive and clutch, the combination of a rotary driving member, a rotary driven member, said members having coacting tapered faces and means for simultaneously varying the magnetism of the rotary driving member and the position, in an axial line, of the rotary driven member, relative to the rotary driving member.

8. In an electrical magnetic drive and clutch, the combination of a prime mover, a shaft driven by the prime mover, a rotary driving member fixedly mounted on said shaft and having tapered faces, means for magnetizing said member, a second shaft having its axis in the line of the first shaft but mechanically separated therefrom, a rotary driven member mounted on said shaft having tapered faces and adapted to be driven thereby in a rotary direction but movable in an axial direction, a device adapted to be driven by the second named shaft when rotated, and means for moving said rotary driven member in an axial direction along said second named shaft to and from the mechanically separated rotary driving member.

9. In an electrical magnetic drive and clutch, the combination of a rotary driving member having the general form of a disk with a taper face, a series of coils thereon, a source of electricity in circuit with said coils, means for varying the current transmitted through the coils, a rotary driven member having the general form of an annulus with its inner periphery having a tapered face, closed coils thereon, means for moving the driven member relative to the driving member whereby the driven member will envelop, as it is moved in or out, more or less of the driving member, and means for imparting rotary motion to the driving member and mechanism energized by the movement of the driven member.

10. In an electrical magnetic drive and clutch, the combination of a rotating driving member having a tapered face, means for varying the magnetism of said member, a structurally independent driven member having a tapered face adapted to coact with the tapered face of the driving member, and means for quickly changing the air gap and the magnetic impediment between said members.

11. In an electrical magnetic drive and clutch the combination of a rotary driving member occupying a fixed position; a rotary driven member adapted to be moved axially as regards the driving member, together with means for simultaneously varying the magnetization of the driving member and the physical relation in an axial line of the driven member relative to the driving member.

In testimony whereof, I affix my signature in the presence of two witnesses.

DAVID CARL HENRY.

Witnesses:
   C. F. ELLIOTT,
   H. E. KOLLACH.